Patented May 3, 1949

2,469,141

UNITED STATES PATENT OFFICE 2,469,141

POLYSULFIDE POLYMER AND PROCESS OF MAKING

Robert O. Alexander, Trenton, N. J., assignor to Thiokol Corporation, Trenton, N. J., a corporation of Delaware No Drawing. Application November 13, 1946, Serial No. 709,415

8 Claims. (Cl. 260—13)

This invention relates to liquid compositions adapted among other purposes for use as coating or impregnating compositions.

One of the objects of the invention is to produce a liquid composition having a combination of properties including the following: (1) good film-forming properties; (2) formation of the film having the desired properties merely by removal, e. g. by evaporation of the liquid medium employed as a part of the composition; (3) high concentration of solids coupled with relatively low viscosity; (4) good adhesion of the film deposited by the composition, especially to metals without the necessity of using a priming coat; (5) water resistance of the film; (6) resistance of the film towards solvents other than water, e. g. gasoline, kerosene, crude oil, benzol, toluene and other aromatic hydrocarbons; (7) resistance of the film toward abrasion, e. g. of the sand blasting type; (8) toughness and flexibility of the film without the necessity of using plasticizers.

In accordance with the invention, a composition of matter is produced which has a continuous phase and a discontinuous phase. The continuous phase is a solution of a resin, natural or synthetic, and a solvent for that resin. From the generic viewpoint, resinous materials in general may be employed and the number thereof is correspondingly large, although limited somewhat by the fact that the resinous material employed must be soluble in a water insoluble solvent which is essentially a non-solvent for the discontinuous phase. The said discontinuous phase is a polysulfide polymer which will hereinafter be more fully defined and illustrated as to the definition and scope of that term. The polysulfide polymer is dispersed as a discontinuous phase but is not in a colloidal condition. One of the unique properties of polysulfide polymers in general is their insolubility in a great many solvents which dissolve or attack other polymers and advantage of that property is taken in the present invention. The fact that the polysulfide polymer particles are not dissolved to form a true solution or even a colloidal solution makes it possible to obtain a high concentration of disperse phase in relation to the continuous phase or the solvent used to make the continuous phase, without substantially increasing the viscosity of the continuous phase. It therefore becomes possible to obtain a liquid composition having a very high concentration of solids together with all the advantages flowing therefrom. For example, one application of a coating of said composition will produce a film having a thickness much greater than that which could be obtained from a composition having a lower concentration of solids. This leads to a great saving in labor and solvent cost, although the advantages of the invention are by no means limited to advantages of economy. Furthermore as a result of getting a high solid concentration with low viscosity, the composition is readily applied, e. g. by brushing, spraying, etc. In addition to those advantages the combination of properties which is obtained in the film deposited from the composition by the removal of the solvent for the continuous phase constitutes an important feature or attribute of the invention. Those properties are not merely the sum of the expected properties resulting from the resin and the polysulfide polymer but on the contrary are unexpected.

In general the proportion by weight of the polysulfide polymer to the total weight of the composition lies between about 10 to 60 per cent by weight and the ratio of resinous material to the polymer by weight varies from about 10 to about 100 per cent.

It will be seen that the invention therefore includes the use of three principal materials: (1) a polysulfide polymer, (2) a resinous material, and (3) a solvent which is not a solvent for the polysulfide polymer but is a solvent for the resin.

The present invention employs polysulfide polymers in general which may be defined as follows:

A polysulfide polymer is a synthetic polymer comprising recurring units selected from the group consisting of: $S_xRS_x$ and

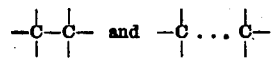

where S is a sulfur atom, $x$ is a numeral varying from 1 to 3 and R is a divalent and R' a polyvalent radical selected from the group consisting of

representing, respectively, adjacent carbon atoms and carbon atoms joined to and separated by intervening structure.

There are, of course, a great many polysulfide polymers. Some are purely linear, some are wholly cross linked and others are partially cross linked. The above definition is sufficiently comprehensive to include polysulfide polymers generically for the purposes of the present invention. The present invention obviously does not reside in the preparation of polysulfide polymers per se individually or collectively but rather resides in the use of polysulfide polymers and makes use of properties which characterize polysulfide polymers generically. This statement is made so that it will be clear that the invention is not limited to the use of any particular polysulfide polymer. Those skilled in the art know that the linear polysulfide polymers falling within the scope of the above definition may be made by the reaction of alkaline polysulfides with (a) organic compounds having a single halogen atom attached to each of two different carbon atoms. Rather than burden this application with long lists of such organic compounds, they are herein incorporated by reference to numerous Patrick patents, e. g. 2,216,044, September 24, 1940; 1,890,191, December 6, 1932. The cross linked polysulfide polymers may be made by a similar reaction by using (b) organic compounds having three or more carbon attached halogen atoms. Mixtures of type (a) and type (b) compounds produce polymers where the density of cross linkage may be controlled by varying the proportion of type (b) compounds to those of type (a) in the reaction of an alkaline polysulfide with a mixture of one or more type (b) compounds with one or more type (a) compounds. Examples of type (b) compounds are as follows:

(1)     1,2,3 trichloropropane

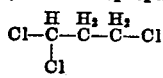

(2)     1,1,2 trichloroethane

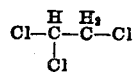

(3) Beta, beta', gamma, gamma' tetchloro n-propyl ether

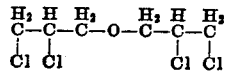

(4) Beta, beta', gamma, gamma', tetrachloropropyl formal

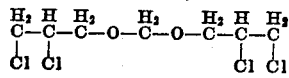

(5)     1,2,3,4 tetrachlorobutane

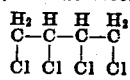

(6)     1,2,3,4,5 pentachloropentane

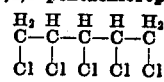

The above description of polysulfide polymers is given merely to provide a sufficiently extensive description thereof to justify use in the claims of the above definition covering polysulfide polymers generically because, as previously stated, the invention does not reside in the polysulfide polymers per se nor in the use of any particular polysulfide polymer, but rather in the utilization as described and claimed of polysulfide polymers.

Since the invention employs soluble resinous substances generally, in the generic aspect of the invention, the number of such resinous substances is naturally large, including as it does the soluble natural resins, e. g. copal, dammar, shellac, etc., and numerous synthetic or artificial resinous substances, embracing the following: alkyd resins, soluble vinyl polymers and copolymers, chlorinated rubber, soluble phenol formaldehyde resins, cellulose esters, cellulose ethers, acrylic acid ester polymers, vinylidene polymers and copolymers, rubber hydrochloride, chlorinated diphenyls, urea formaldehyde polymers, toluene sulfonamide formaldehyde reaction products, coumarone-indene polymers, styrene polymers and copolymers, rosin, rosin esters.

As above stated, the resinous substance is used in the form of a solution thereof in a water insoluble liquid, and with this understanding those skilled in the art will have no difficulty in ascertaining the scope of solvents to be employed because the solubility of the resinous substances in water insoluble liquids is in itself a matter within the skill of the art, therefore numerous solvents and solvent mixtures may be employed with the further understanding that said solvents or solvent mixtures should be such as will not have a solvent action on the polysulfide polymer. Here again those skilled in the art know the solvents which dissolve and which do not dissolve polysulfide polymers. They know, for example, that the highly chlorinated hydrocarbons and carbon bisulfide have a solvent action on the polysulfide polymers and therefore should be avoided. With this information, it is not necessary to set forth a long list of particular solvents and solvent mixtures which may be employed. Typically illustrative examples of liquids which are suitable because they act as solvents for the resinous substance but do not act as solvents for the polysulfide polymer are as follows:

n-Amyl acetate     Methyl isobutyl ketone
Sec-amyl acetate     Methyl ethyl ketone
n-Amyl alcohol     Nitroethane
Sec-amyl alcohol     Nitromethane
Ethyl acetate     1-nitropropane
n-Butyl acetate     2-nitropropane
Isobutyl acetate     Isophorone
Sec-butyl acetate     Isopropyl acetate
n-Butyl alcohol     Benzene
Isobutyl alcohol     Xylene
Sec-butyl alcohol     Toluene
n-Butyl lactate     Petroleum naphthas
Cyclohexanol     Turpentine
Cyclohexanone     Mineral spirits
Mesityl oxide     V. M. and P. naphtha Solvents typical of those to be avoided are as follows:

Ethylene dichloride     Tetrachlorethylene
Trichlorethane     Trichlorethylene
Tetrachlorethane     Propylene dichloride
Monochlorobenzene     Perchlorethylene
Pentachlorethane In accordance with the process of the invention, the polysulfide polymer is used in the form of a latex, that is, a dispersion of the polymer particles in water, for example, a dispersion containing 25 to 80 per cent by weight of polymer and the remainder water. The solution of resinous substances in a water insoluble solvent is then added to and thoroughly incorporated with the latex and this addition is continued until the aqueous dispersion breaks, a phenomenon which is accompanied by the separation of the water in which the polysulfide polymer was dispersed. Thereafter additional quantities of resin solution or solvent can be added depending upon the ratio of components which is desired. In accordance with the present invention, the ratio of resinous substance to polysulfide polymer may be between about 10 per cent and 100 per cent by weight. The ratio of polysulfide polymer to the sum of the weights of polymer, resin and water insoluble solvent may be between about 10 per cent and 60 per cent by weight, 10 per cent to 40 per cent being preferred. The composition may also contain inorganic or organic fillers or pigments.

It has been found that if a wetting agent is used, the aqueous dispersion of polysulfide polymer can be broken (so-called reversal of phase) by the use of solutions of resinous substances in general in water insoluble liquids. However, it has also been found that the use of such wetting agents has an adverse effect upon one of the properties it is desired to obtain in applying the invention in certain directions, that property being the adhesion of the resulting film to surfaces of steel and other metals. It has also been found that this particular adverse effect can be omitted by doing two things, (1) omitting the use of a wetting agent and (2) restricting the resinous substance to certain particular classes thereof. In other words, certain classes of resinous substances have been found which, when incorporated with polysulfide polymer latex in the form of a solution of said resinous substances in water insoluble liquid, will cause breaking of the aqueous dispersion without the use of any wetting agent, whereby a product is produced which possesses all of the above-mentioned desirable qualities including adhesion to steel and other metallic surfaces of the film deposited from the liquid composition by removal of the solvent for the continuous phase from said composition by evaporation or otherwise. Those classes of resinous substances which produce the particular effect above-mentioned include the following: (a) copolymers of vinyl chloride and vinyl acetate containing carboxylic anhydride groups obtainer, for example, by copolymerizing vinyl chloride and vinyl acetate with maleic anhydride. One example of such a resinous substance is a product having the trade designation or trade-mark VMCH Vinylite which is a copolymer of (a) vinyl acetate, (b) vinyl chloride and (c) maleic anhydride in a ratio of about 86 per cent of (a), 13 per cent of (b) and 1 per cent of (c); (b) water insoluble cellulose ethers and esters, e. g. water insoluble ethyl cellulose and cellulose nitrate, e. g. pyroxylin; (c) chlorinated rubber; (d) rubber hydrochloride; (e) acrylic and alkylacrylic ester polymers.

In order to illustrate the principles of the invention, the following specific embodiments of the process and products thereof will be described specifically.

The polymer latex or dispersion may be made by any of the methods known to the art, as, for example, the methods fully described in Patrick 1,216,044, September 24, 1940; 2,363,614, November 28, 1944; 2,142,145, January 3, 1939, and 2,278,128, March 31, 1942.

*Example 1*—To 500 grams of polysulfide polymer latex containing for example, 52 per cent by weight of polymer there is added a wetting agent, for example, 5 grams of a 20 per cent solution of potassium oleate in water. The dispersion is agitated and there is gradually added 131 grams of a 35 per cent solution of nitrocellulose in butyl acetate and then more butyl acetate is added in small increments until a point is reached where the water dispersion breaks and water is separated. The separated water may be removed by any suitable means, as, for example, decantation. The resulting material is a suspension of non-colloidal particles of polysulfide polymer suspended in a continuous phase of the solution of nitrocellulose in butyl acetate.

It will be noted that a wetting agent is used in the above process and where such wetting agent is used there may be substituted for the specific continuous phase above-mentioned solutions generally of resinous substances in solvents which are capable of dissolving such resinous substances and incapable of dissolving the polysulfide polymer. Instead of potassium oleate wetting agents in general may be employed including the following:

Dioctyl ester of sodium sulfosuccinic acid
Isobutyl naphthalene sodium sulfonate
Alkylated aryl sulfonates
Sodium salt of aryl alkyl ether sulfate
Polyoxyalkylene ether of partial palmitic acid ester
Polyoxyalkylene ether of partial stearic acid ester
Polyoxyalkylene ether of partial oleic acid ester
Fatty acid soap of morpholine
Fatty acid soap of monoethanolamine In the following examples it will be noted that no wetting agent is employed and where the wetting agent is omitted it has been found that there are only certain classes of resinous substances which when dissolved in a solvent and added to the aqueous polysulfide polymer dispersion will cause breaking of the dispersion and separation of water. The resinous substances which have been found to possess this property are, as previously mentioned, (a) copolymers of vinyl acetate and vinyl chloride which also include a polycarboxylic acid anhydride during copolymerization so that the resulting copolymer contains carboxyl or anhydride groups; (b) water insoluble cellulose ethers and esters, e. g. water insoluble ethyl cellulose (having, for example, an ethoxy content of about 43 to 50 per cent) and cellulose nitrate; (c) chlorinated rubber containing, for example, a chlorine content of about 62 to 67 per cent; (d) rubber hydrochloride, and (e) acrylic and alkylacrylic ester polymers.

*Example 2*—To 120 grams of a polysulfide polymer dispersion containing about 50 per cent by weight of polymer are added 30 grams of a 20 per cent by weight solution in a solvent mixture consisting of 90 parts by weight of methyl isobutyl ketone and 10 parts by weight of methyl ethyl ketone of a copolymer obtained by copolymerizing about 86 per cent by weight of vinyl acetate, about 13 per cent by weight of vinyl chloride and about 1 per cent by weight of maleic anhydride. The mixture is agitated until a clear water layer separates from a residual heavy dough-like material. The water, amounting to about 39 grams, is removed and an additional quantity of about 170 grams of the 20 per cent vinyl copolymer solution are added with mixing to the said dough. If desired, the composition can be diluted by the addition of the above-mentioned solvent mixture and fillers or pigments may be added. Where resistance of the film toward solvents other than water (property No. 6 above-mentioned) is required in a high degree, the above composition is particularly recommended.

*Example 3*—To 120 grams of an aqueous dispersion of polysulfide polymer containing, for example, 50 per cent by weight of polymer are added 32 grams of a 30 per cent by weight solution of an ethyl cellulose having an ethoxy content of about 43 to 50 per cent, the said ethyl cellulose having been previously dissolved in a solvent mixture consisting of 80 parts by weight of normal butyl acetate and 20 parts by weight of methyl ethyl ketone. The mixture is agitated until a clear water layer separates from a residual heavy dough-like material. The water, amounting to about 43 grams, is removed, e. g. by siphoning or decantation and an additional quantity of about 100 grams of the ethyl cellulose solution are added to and incorporated with the dough. If desired, a further quantity of the said solvent mixture may be added and pigments or fillers may also be incorporated.

*Example 4.*—To 118 grams of an aqueous dispersion of a polysulfide polymer containing, for example, about 50% by weight of polymer are added 30 grams of a 50 per cent solution by weight of chlorinated rubber in a solvent mixture consisting of 50 parts by weight of toluene and 50 parts by weight of n-butyl acetate, the chlorinated rubber containing, for example, about 45 to 50 per cent by weight of chlorine. The mixture is agitated until a clear water layer separates from a residual heavy dough-like material. The water, amounting to about 40 grams, is removed by decanting or siphoning and an additional quantity of about 100 grams of the chlorinated rubber solution are added and incorporated with the dough.

This is a continuation-in-part of my copending application Serial No. 512,595, filed December 2, 1943, for Polysulfide polymer dispersion, now abandoned.

I claim:

1. A composition of matter having a continuous phase and a discontinuous phase the discontinuous phase comprising a non-colloidal dispersion of a polysulfide polymer in said continuous phase, the continuous phase comprising a solution of a resinous substance in a water insoluble liquid which is a solvent for the resin and a non-solvent for the polysulfide polymer, said polysulfide polymer being a synthetic polymer comprising recurring units selected from the group consisting of $S_xRS_x$ and $$\begin{array}{c}S_xR'\ S_x\\ S_{2x}\\ S_xR'\ S_x\end{array}$$

where S is a sulfur atom, $x$ is a numeral varying from 1 to 3, R has a valence of two and R' has a valence of more than two, R and R' being radicals selected from the group consisting of

  and  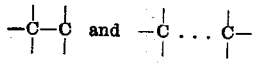

representing, respectively, adjacent carbon atoms and carbon atoms joined to and separated by intervening linkage, the ratio by weight of said polymer to the total weight of polymer, resin and water insoluble liquid varying from about 10 to about 60 per cent and the ratio of resin to polymer by weight varying from about 10 to about 100 per cent.

2. A composition of matter having a continuous phase and a discontinuous phase the discontinuous phase comprising a non-colloidal dispersion of a polysulfide polymer in said continuous phase, the continuous phase comprising a solution of a resinous substance in a water insoluble liquid which is a solvent for the resin and a non-solvent for the polysulfide polymer, said polysulfide polymer being a synthetic polymer comprising recurring units selected from the group consisting of $S_xRS_x$ and $$\begin{array}{c}S_xR'\ S_x\\ S_{2x}\\ S_xR'\ S_x\end{array}$$

where S is a sulfur atom, $x$ is a numeral varying from 1 to 3, R has a valence of two and R' has a valence of more than two, R and R' being radicals selected from the group consisting of

  and  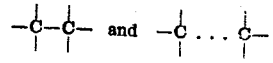

representing, respectively, adjacent carbon atoms and carbon atoms joined to and separated by intervening linkage, the ratio by weight of said polymer to the total weight of polymer, resin and water insoluble liquid varying from about 10 to about 60 per cent and the ratio of resin to polymer by weight varying from about 10 to about 100 per cent, said resinous substance being a copolymer of vinyl acetate, vinyl chloride and maleic anhydride.

3. A composition of matter having a continuous phase and a discontinuous phase and discontinuous phase comprising a non-colloidal dispersion of a polysulfide polymer in said continuous phase, the continuous phase comprising a solution of a resinous substance in a water insoluble liquid which is a solvent for the resin and a non-solvent for the polysulfide polymer, said polysulfide polymer being a synthetic polymer comprising recurring units selected from the group consisting of $S_xRS_x$ and $$\begin{array}{c}S_xR'\ S_x\\ S_{2x}\\ S_xR'\ S_x\end{array}$$

where S is a sulfur atom, $x$ is a numeral varying from 1 to 3, R has a valence of two and R' has a valence of more than two, R and R' being radicals selected from the group consisting of

  and  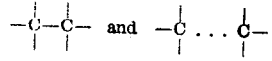

representing, respectively, adjacent carbon atoms and carbon atoms joined to and separated by intervening linkage, the ratio by weight of said polymer to the total weight of polymer, resin and water insoluble liquid varying from about 10 to about 60 per cent and the ratio of resin to polymer by weight varying from about 10 to about 100 per cent, said resinous substance being a water insoluble cellulose ether.

4. A composition of matter having a continuous phase and a discontinuous phase the discontinuous phase comprising a non-colloidal dispersion of a polysulfide polymer in said continuous phase, the continuous phase comprising a solution of a resinous substance in a water insoluble liquid which is a solvent for the resin and a non-solvent for the polysulfide polymer, said polysulfide polymer being a synthetic polymer comprising recurring units selected from the group consisting of $S_xRS_x$ and $$\begin{array}{c}S_xR'\ S_x\\ S_{2x}\\ S_xR'\ S_x\end{array}$$

where S is a sulfur atom, $x$ is a numeral varying from 1 to 3, R has a valance of two and R' has a valence of more than two, R and R' being radicals selected from the group consisting of

  and  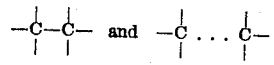

representing, respectively, adjacent carbon atoms and carbon atoms joined to and separated by intervening linkage, the ratio by weight of said polymer to the total weight of polymer, resin and water insoluble liquid varying from about 10 to about 60 per cent and the ratio of resin to polymer by weight varying from about 10 to about 100 per cent, said resinous substance being a chlorinated rubber.

5. Process which comprises incorporating with an aqueous dispersion of a polysulfide polymer a solution of a resinous substance in a water insoluble liquid which is a non-solvent for said polymer, the proportion of said solution being sufficient to cause the breaking of said aqueous dispersion and the separation of water, and the said solution being incorporated with the aqueous dispersion in the presence of a wetting agent and obtaining a non-colloidal dispersion of said polymer as a discontinuous phase in said solution as a continuous phase, said polysulfide polymer being a synthetic polymer comprising recurring units selected from the group consisting of $S_xRS_x$ and

where S is a sulfur atom, $x$ is a numeral varying from 1 to 3, R has a valence of two and R' has a valence of more than two, R and R' being radicals selected from the group consisting of

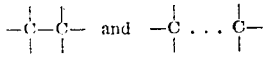

representing, respectively, adjacent carbon atoms and carbon atoms joined to and separated by intervening linkage.

6. Process which comprises incorporating with an aqueous dispersion of a polysulfide polymer a solution of a copolymer of vinyl chloride, vinyl acetate and maleic anhydride in a water insoluble liquid which is a non-solvent for said polymer, the proportion of said solution being sufficient to cause the breaking of said aqueous dispersion and the separation of water, and the said solution being incorporated with the aqueous polymer dispersion in the absence of a wetting agent and obtaining a non-colloidal dispersion of said polymer as a discontinuous phase in said solution as a continuous phase, said polysulfide polymer being a synthetic polymer comprising recurring units selected from the group consisting of $S_xRS_x$ and

where S is a sulfur atom, $x$ is a numeral varying from 1 to 3, R has a valence of two and R' has a valence of more than two, R and R' being radicals selected from the group consisting of

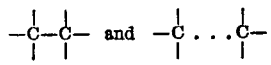

representing, respectively, adjacent carbon atoms and carbon atoms joined to and separated by intervening linkage.

7. Process which comprises incorporating with an aqueous dispersion of a polysulfide polymer a solution of a water insoluble cellulose ether in a water insoluble liquid which is a non-solvent for said polymer, the proportion of said solution being sufficient to cause the breaking of said aqueous dispersion and the separation of water, and the said solution being incorporated with the aqueous polymer dispersion in the absence of a wetting agent and obtaining a non-colloidal dispersion of said polymer as a discontinuous phase in said solution as a continuous phase, said polysulfide polymer being a synthetic polymer comprising recurring units selected from the group consisting of $S_xRS_x$ and

where S is a sulfur atom, $x$ is a numeral varying from 1 to 3, R has a valence of two and R' has a valence of more than two, R and R' being radicals selected from the group consisting of

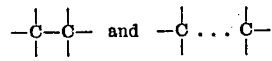

representing, respectively, adjacent carbon atoms and carbon atoms joined to and separated by intervening linkage.

8. Process which comprises incorporating with an aqueous dispersion of a polysulfide polymer a solution of a chlorinated rubber in a water insoluble liquid which is a non-solvent for said polymer, the proportion of said solution being sufficient to cause the breaking of said aqueous dispersion and the separation of water, and the said solution being incorporated with the aqueous polymer dispersion in the absence of a wetting agent and obtaining a non-colloidal dispersion of said polymer as a discontinuous phase in said solution as a continuous phase, said polysulfide polymer being a synthetic polymer comprising recurring units selected from the group consisting of $S_xRS_x$ and

where S is a sulfur atom, $x$ is a numeral varying from 1 to 3, R has a valence of two and R' has a valence of more than two, R and R' being radicals selected from the group consisting of

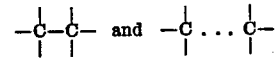

representing, respectively, adjacent carbon atoms and carbon atoms joined to and separated by intervening linkage.

ROBERT O. ALEXANDER.

REFERENCES CITED

The following references are of record in the file of this patent:

UNITED STATES PATENTS

| Number | Name | Date |
|---|---|---|
| 2,277,941 | Almy | Mar. 31, 1942 |
| 2,347,233 | Abernathy | Apr. 25, 1944 |

FOREIGN PATENTS

| Number | Country | Date |
|---|---|---|
| 109,746 | Australia | Feb. 22, 1940 |